Nov. 6, 1962  G. E. MILLER, JR  3,062,475
FLEXIBLE CONTAINER FOR LEADERS AND THE LIKE
Filed April 8, 1960
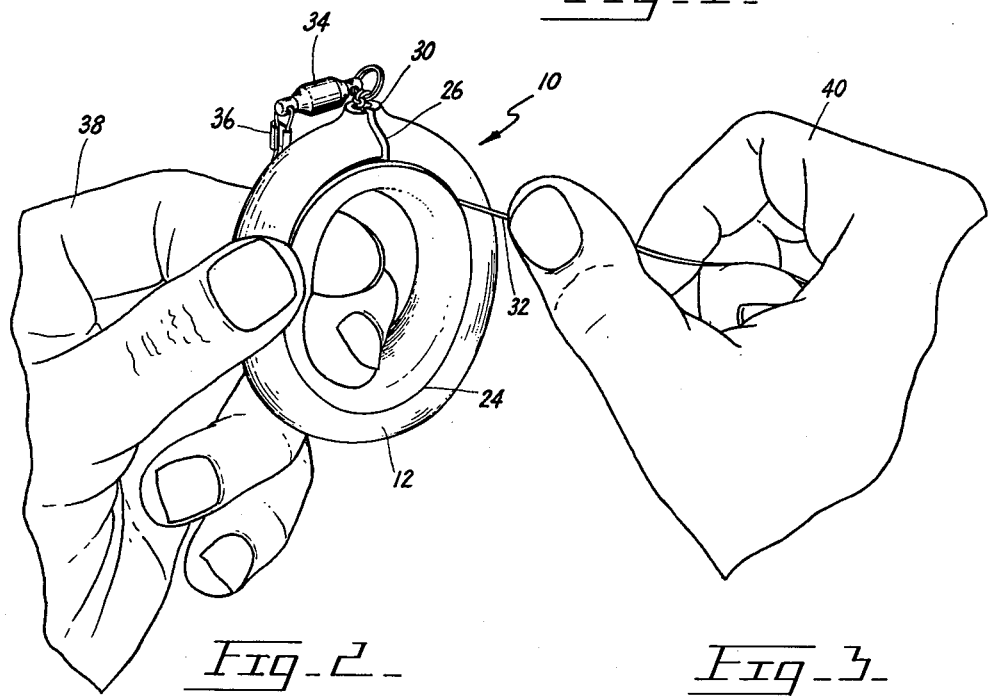
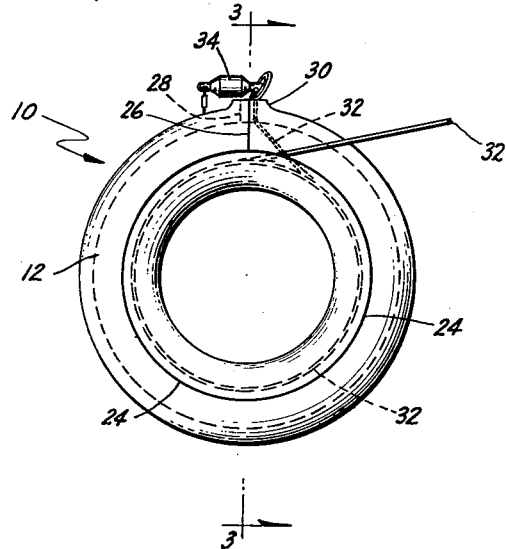
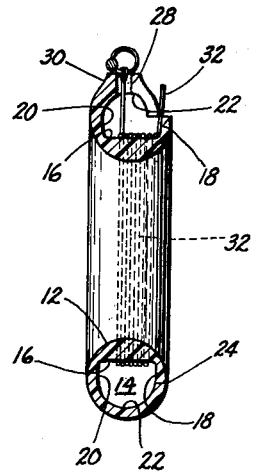
INVENTOR.
George E. Miller, Jr.
BY
Stuart R. Peterson
ATTORNEY

United States Patent Office 3,062,475
Patented Nov. 6, 1962

3,062,475
FLEXIBLE CONTAINER FOR LEADERS
AND THE LIKE
George E. Miller, Jr., 7000 W. 26th St.,
Minneapolis 26, Minn.
Filed Apr. 8, 1960, Ser. No. 21,002
9 Claims. (Cl. 242—85.1)

This invention relates to a flexible container for leaders, fish lines, spinners, artificial flies, and the like, whereby a fisherman may keep his tackle box neat and orderly.

One important object of the invention is to provide a container for leaders and other items of this character that will be self closing so that the items disposed therein will not inadvertently become dislodged from the container.

Another object of the invention is to provide a flexible container in which resilient leaders and fish lines can be quickly inserted and removed.

A further object of the invention is to provide a container in which a variety of other individual items, such as swivels, fish hooks and spinners, can be readily stored until wanted for use.

Still further, the invention has for an object the firm retention of leaders and fish lines without having to remove attached items which are too large to fit within the interior of the container. More specifically, where fish hooks, swivels, sinkers and such attached items are of a size that they cannot be accommodated within the confines of my container, the may readily remain outside without causing sections of the leader or fish line to be accidentally withdrawn due to the possible shifting of my container within a tackle box.

Also, the invention has for an object the provision of a flexible container that may be easily carried in one's pocket, whereby it is readily available at all times even though the fisherman may not be in the immediate vicinity of his tackle box.

Yet another object of the invention is to provide a flexible container of the foregoing nature that can be manufactured at an extremely low cost, thereby encouraging its widespread use.

For further objects and advantages of the invention and for a more detailed understanding thereof, reference is to be had to the following description taken in conjunction with the accompanying drawing, in which:

FIGURE 1 is a perspective view illustrating the manner in which a resilient leader can be inserted in my flexible container;

FIGURE 2 is a side elevational view corresponding to FIGURE 1, the confined portion of the leader appearing in dotted outline, and FIGURE 3 is a sectional view taken in the direction of line 3—3 of FIGURE 2.

Referring now in detail to the drawing, my unitary flexible container has been denoted generally by the reference numeral 10. As is readily apparent, the one-piece container 10 is in the form of a toroid or ring. From the lower portion of FIGURE 3 it can be seen that the container has a circular section providing the outer surface. Also, from this figure it will be discerned that the container possesses a hollow interior 14.

Although the reasons for the particular configuration of the interior 14 will be clearer as the description progresses, it can be explained that the interior 14 has a flat base 16, parallel side walls 18, 20 and a dome-shaped or semicircular top or outer wall 22.

Close inspection of FIGURE 3, particularly the lower portion thereof, will reveal that the base 16 is substantially twice as wide as the radial height of the side walls 18, 20. Also, the dome-shaped wall 22 has a radius of curvature equal to one-half the width of the base 16.

Owing to the round configuration of the exterior or outer surface 12 as viewed in FIGURE 3, it follows that the thickness of the ring member is the least at the juncture or corner formed by the base 16 with the side walls 18, 20.

At the side of the ring member where the wall 18 joins the dome-shaped wall 22, that is, midway between the radius of the base 16 as measured from the center of the toroid 10 and the greatest radius of the wall 22 as also measured with respect to the center of the toroid, there is a continuous slit labeled 24 providing access to the interior 14. A second slit 26, however, extends quadrantly from the slit 24 to a radial or central plane. Lying in this plane, which is assumed to pass through the center of FIGURE 3, is a radially directed cylindrical passage or aperture 28 leading into the interior 14 via an integral boss 30 and the dome-shaped wall 22. In other words, the slit 26 has its ends communicating with both the slit 24 and the aperture 28.

Vinyl plastic has been found very satisfactory, as a material for my container, although the proper flexibility could be gained from the use of rubber. Vinyl has the advantage of being inexpensive and can be brightly colored, thereby enhancing its sales appeal and also making it more readily discernible in the tackle box.

One of the advantages of the instant invention stems from the ease with which the container can be manufactured. Accordingly, it will be explained that a metal ring having a cross-sectional configuration corresponding to that of the interior 14 is employed. This ring has a radially projecting rod having a diameter corresponding to that of the aperture 28. Using the rod as a handle, the metallic ring is simply dipped into the molten plastic and then mounted in an oven with the rod extending downwardly. When the plastic is cured, the slit 24 is formed as with a cutting knife mounted on a drill press. The slit 26 can then be manually cut. Also, any excess material in the region of the boss 30 can be cut away. The metal ring and its rod can then be removed from the now completely formed container 10.

Having presented the foregoing information, it is believed that the various ways in which my container 10 can be employed will be generally appreciated. However, there is one feature that is perhaps not readily discernible. For the sake of illustration, it will be assumed that one wishes to contain a resilient leader 32, the pictured leader 32 having a swivel 34 and a clasp 36 thereon for attachment to a conventional fish line. Also, although not shown, the end opposite the clasp 36 may have the usual fish hook thereon. While in many instances the swivel 34 and clasp 36 can be fully inserted within the interior 14 via the slit 24, we will assume for the sake of discussion that these items are either too large or that the fisherman prefers to have them on the outside of the container 10.

Accordingly, the container 10 is grasped in one hand 38 and the swivel 34 is held in the other hand 40. The leader 32 is then initially inserted into the aperture 28 through the slit 26, the container 10 being easily flexed so as to open the slit 26.

After this, the fisherman advances the leader 32 in a clockwise direction around the container 10. Normally, the edges of the walls 18, 22 at the slit 24 are in engagement with each other due to the inherent resiliency of the plastic material. However, the adjacent edge belonging to the wall 18 is easily flexed inwardly toward the central plane of the member 10 because of the deflective action resulting from the tensile pull exerted on the leader.

At this time, it will be explained that the perpendicularity of the wall 18 with the base 16 is most important in achieving a facile insertion of the leader 32. This is so for if the base 16 were concave or arcuate the leader 32 would tend to seek immediately an orientation more in the plane through the center of the ring member 10. This would result in the leader 32 constantly being bent more about the edge of the wall 22 lying adjacent the slit 24 than it should be for easy insertion. Stated somewhat differently, the configuration of the interior 14 that has been devised enables the portion of the leader 32 that has already been inserted to lie substantially at the juncture of the base 16 and wall 18. Of course, the turns may later shift to almost any location laterally of the base 16, as depicted in FIGURE 3, but this is of little import inasmuch as it is only that portion of the leader 32 that is tangent to the base that is controlling. This is an important feature that might not be fully appreciated without the foregoing explanation.

After encircling the base 16 as many times as needed, the free end of the leader 32 can be pulled through the slit 26 so that it projects radially through the aperture 28. On the other hand, should the free end of the leader 32 have a fish hook attached thereto, the fisherman has the option of inserting the hook through the slit 24 if the hook is small enough to be accommodated within the interior 14 or he may simply engage the barb thereof in the aperture 28, eliminating any exterior slack by merely pulling the external portion of the leader 32 sufficiently far from the aperture 28. The tendency for the dome-shaped wall 22 to resume its engagement with the wall 18 will exert sufficient frictional grip on the leader 32 so as to hold it in place.

It should also be understood that location of the slit 24 at one side is very important in retaining the contents within the interior 14, for after the leader 32 has been inserted, any resiliency thereof will act against the dome-shaped wall 22 and not where the slit 24 is located. Consequently, there is no likelihood that the leader 32, or other article, will become dislodged from the interior 14. The base 16, together with the perpendicular side wall 18, makes the insertion and withdrawal of the leader 32 easier, as hereinbefore pointed out. Actually, the right angle relationship of the side wall 20 helps in this respect, too, for with the circular exterior 12 the juncture of this wall 20 with the base 16 produces a thickness of ring material that is the least of any place. Thus, while most of the flexing during insertion occurs in the immediate vicinity of the normally aligned edges of the walls, 18, 22, nonetheless the thiness of said juncture, that is where the side wall 20 is integrally connected to the base 16, permits additional flexing at this location, as close inspection of the upper portion of FIGURE 3 will show.

The preferred form of my invention has been herein described and illustrated in the accompanying drawing, and the invention has been more particularly defined in the following claims appended hereto.

What is claimed is:

1. A container for leaders and the like comprising a hollow ring member of flexible material and of unitary construction having a continuous slit at one side providing normally aligned inner and outer edges normally abutting each other, both of said edges being of said flexible material so that one of which edges may be flexed inwardly toward the central plane of the ring member for the insertion of a leader into the interior of said member, said ring member also having a slit extending from said continuous slit toward said central plane.

2. A container for leaders and the like comprising a hollow ring member of flexible material having a continuous slit at one side providing normally aligned inner and outer edges engaging each other, one of which edges may be flexed inwardly toward the central plane of the ring member for the insertion of a leader into the interior of said member, said ring member also having a second slit extending from said continuous slit to a locus substantially in said central plane.

3. A flexible container in accordance with claim 2 in which said ring member has a radially directed aperture disposed in said central plane, said second slit communicating therewith.

4. A container for leaders and the like comprising a hollow ring member of flexible material having a continuous slit at one side with said slit being located at a radial distance substantially midway between the inner and outer radii of said ring member as measured from the axial center of the ring member, the interior of said ring member being formed with a flat base having a radius intermediate the inner radius of said member and the radius of said slit with the surface of said interior residing between said slit and base being in a plane generally parallel to said central plane.

5. A flexible container in accordance with claim 4 in which the surface of said interior opposite said first-mentioned surface also resides in a plane generall parallel to said central plane.

6. A flexible container in accordance with claim 5 in which the surface of said interior opposite its said base is semicircular.

7. A flexible container in accordance with claim 6 in which said semicircular surface is provided with a cylindrical aperture leading radially outward to the exterior of said ring member and a second slit extending between said aperture and said continuous slit.

8. A container for leaders and the like comprising a hollow member of flexible material having a continuous slit at one side for access to the interior of said ring member, the exterior of said member being circular when viewed in cross-section and the interior of said member being channel-shaped from the radius of said slit inwardly to a lesser radius so as to provide a flat base and a pair of parallel side walls, whereby the thickness of said ring member is the least at the junctures of said base with said side walls.

9. A flexible container in accordance with claim 8 in which the interior is dome-shaped from the radius of said slit outwardly to a greater radius, there being an inwardly directed radial aperture residing in a plane bisecting said base and there being a second slit extending between said aperture and continuous slit.

References Cited in the file of this patent

UNITED STATES PATENTS

| | | |
|---|---|---|
| 1,256,278 | Takeuchi | Feb. 12, 1918 |
| 1,890,945 | Hormel | Dec. 12, 1932 |
| 2,553,097 | Lampe | May 15, 1951 |
| 2,590,695 | Gomberg | Mar. 25, 1952 |
| 2,603,429 | Jaworowski et al. | July 15, 1952 |